United States Patent [19]
Lee et al.

[11] Patent Number: 6,003,131
[45] Date of Patent: Dec. 14, 1999

[54] COMPUTER SYSTEM WITH A VARIETY OF APPLICATIONS AND METHOD FOR OPERATING THE SAME

[75] Inventors: Sang-Jin Lee; Kyong-Kyu Lee, both of Suwon, Rep. of Korea

[73] Assignee: SamSung Electronics Co., Ltd., Kyungki-do, Rep. of Korea

[21] Appl. No.: 08/821,198

[22] Filed: Mar. 20, 1997

[30] Foreign Application Priority Data

Mar. 20, 1996 [KR] Rep. of Korea .......................... 96-7581
Mar. 21, 1996 [KR] Rep. of Korea .......................... 96-7723

[51] Int. Cl.$^6$ ..................................................... G06F 9/06
[52] U.S. Cl. .................................................. 713/2; 710/10
[58] Field of Search ....................... 713/1, 2, 3; 709/220, 709/221, 222; 395/712; 710/8, 10

[56] References Cited

U.S. PATENT DOCUMENTS

| 4,070,704 | 1/1978 | Calle et al. ........................ 364/228.1 |
| 5,113,497 | 5/1992 | Dewa ..................................... 395/275 |
| 5,357,378 | 10/1993 | Sideserf et al. ........................ 395/700 |
| 5,379,421 | 1/1995 | Palazzi, III et al. .................... 395/500 |
| 5,410,706 | 4/1995 | Farrand et al. ........................ 395/700 |
| 5,558,577 | 9/1996 | Kato .......................................... 463/36 |
| 5,590,373 | 12/1996 | Whitley et al. ........................ 395/828 |
| 5,799,204 | 8/1998 | Pesto, Jr. ................................. 710/10 |
| 5,854,905 | 12/1998 | Garney .................................... 710/104 |

*Primary Examiner*—Kevin A. Kriess
*Attorney, Agent, or Firm*—Robert E. Bushnell, Esq.

[57] ABSTRACT

A provided computer system has a variety of additional application functions such as television, audio, video, communication, game, home automation functions, etc., as well as general mathematical computation and logic functions. Also, the system has a switch circuit and a booting control circuit. The switch circuit is used in selecting the additional functions which has a plurality of switches corresponding to the functions respectively. The booting control circuit is operated with a first supply voltage VCC_A which allows power supply to apply a second supply voltage VCC_B to central processing unit, several kinds of memory units and input/output peripherals when at least one of the switches is on. The central processing unit loads basic input/output system routines into random access memory so as to initialize and check circuits of the computer system, and loads application routines for the additional functions into the random access memory without loading operating system routines when the at least one of the switches is on.

10 Claims, 5 Drawing Sheets

COMPUTER SYSTEM WITH A VARIETY OF APPLICATIONS AND METHOD FOR OPERATING THE SAME

CLAIM OF PRIORITY

This application makes claims all benefits accruing under 35 U.S.C. §119 from an applications for COMPUTER SYSTEM WITH A VARIETY OF APPLICATIONS AND METHOD FOR OPERATING THE SAME earlier filed in the Korean Industrial Property Office on Mar. 20, 1996 and there duly assigned Ser. No. 7581/1996 and COMPUTER SYSTEM WITH A VARIETY OF APPLICATIONS AND METHOD FOR OPERATING THE SAME earlier filed in the Korean Industrial Property Office on Mar. 21, 1996 and there duly assigned Ser. No. 7723/1996.

FIELD OF THE INVENTION

The present invention relates generally to a computer system and an operating method thereof, more particularly to a multimedia computer system which has a variety of additional application functions such as television, audio, video, communication, game, home automation functions, etc., as well as general mathematical computation and logic functions and a method for operating the system.

BACKGROUND OF THE INVENTION

The use of peripheral equipment in computer systems is not new in the art. For example, U.S. Pat. No. 5,590,373 for a Field Programming Apparatus and Method For Updating Programs in a Personal Communications Device to Whitley et al. discloses a field programming apparatus and method for updating programs in a personal communications device. A method is provided for automatically loading a new program from the reprogramming card into memory in an accurate, foolproof manner. This is accomplished using a sequencing program stored in the reprogramming card and loaded into the memory portion of the device, where it is executed.

In U.S. Pat. No. 5,379,421 for an Interactive Terminal For The Access of Remote Database Information to Palazzi III et al. discloses an inexpensive telecommunications device utilizing existent components located in the home or office, such as a television receiver and a telephone, for creating an interactive display terminal for accessing information stored in remote computer databases.

U.S. Pat. No. 5,113,497 for an I/O Control System for a Plurality of Peripheral Devices to Dewa discloses an input/output control system for a plurality of peripheral devices. A basic input/output system program enables a plurality of peripheral devices to interface with a host computer system.

U.S. Pat. No. 5,558,577 for an Electronic Game Machine and Main Body Apparatus and Controllers Used Therein to Kato discloses an electronic game machine and main body apparatus and controllers used therein. The game is attached to the main host computer in this invention.

U.S. Pat. No. 5,410,706 for a Computer System Having a Remote Reboot Facility with Both Hard and Soft Reset Capabilities to Farrand et al discloses a computer system having a remote reboot facility with both hard and soft reset capabilities. FIG. 2 shows pagers and a phone can be connected to a console. A plurality of peripheral devices can be connected to a main host computer. A mechanism for re-booting and bootstrapping the peripheral to the host is provided in this invention.

Finally, U.S. Pat. No. 5,257,378 for a Network Computer Workstation With Initial Program Load Control to Sideserf et al. discloses a network computer workstation with initial program load control. A keyboard, mouse, floppy disk drive, hard disk drive, and a display device are all connected to a CPU.

We have observed that with contemporary systems such as those noted in the foregoing paragraphs, that when the peripherals are turned on, the basic input/output system is not rebooted prior to the loading of the operating system.

SUMMARY OF THE INVENTION

It is therefore an object of the present invention to provide a computer system with a variety of additional application functions whose bootstrapping of the functions is simple.

It is another object of the present invention to provide a method which executes additional application functions upon a computer system.

To attain the objects of the present invention, there is provided a computer system which functions as a television service system, an audio player, a video player, a settop box for video on demand service, a communication service system, a game machine, a home automation system, and so on, the computer system made up of a bus for communicating information, a first memory unit coupled with the bus for storing a set of basic input/output system routines which control input and output peripherals of the computer system, a second memory unit coupled with the bus for storing a set of operating system routines which control the operation of the computer system for the purpose of obtaining an efficient performance thereof and multiple sets of application routines which execute a variety of additional functions, a central processing unit coupled with the bus for processing information according to instructions of the routines, and a third memory unit coupled with the bus, for storing the instructions, the information, temporary variables and immediate information during execution of the instructions by the central processing unit, temporarily; wherein the central processing unit loads the basic input/output system routines into the third memory unit so as to initialize and check circuits of the computer system when a power switch thereof is on, and loads the application routines into the third memory unit without loading the operating system routines when execution of the additional functions is required.

To attain the objects of the present invention, there is provided a method for operating a computer system with additional application functions such as television, video on demand, communication, game, home automation services, and so on, the method made up of initializing and checking circuits of the computer system in accordance with basic input/output system routines when a power switch thereof is on, checking whether execution of the additional functions is required during a predetermined time period, executing the additional functions when the execution of the additional functions is required, and booting the computer system in accordance with operating system routines when the execution of the additional functions is not required during the predetermined time period.

BRIEF DESCRIPTION OF THE DRAWINGS

A more complete appreciation of this invention, and many of the attendant advantages thereof will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
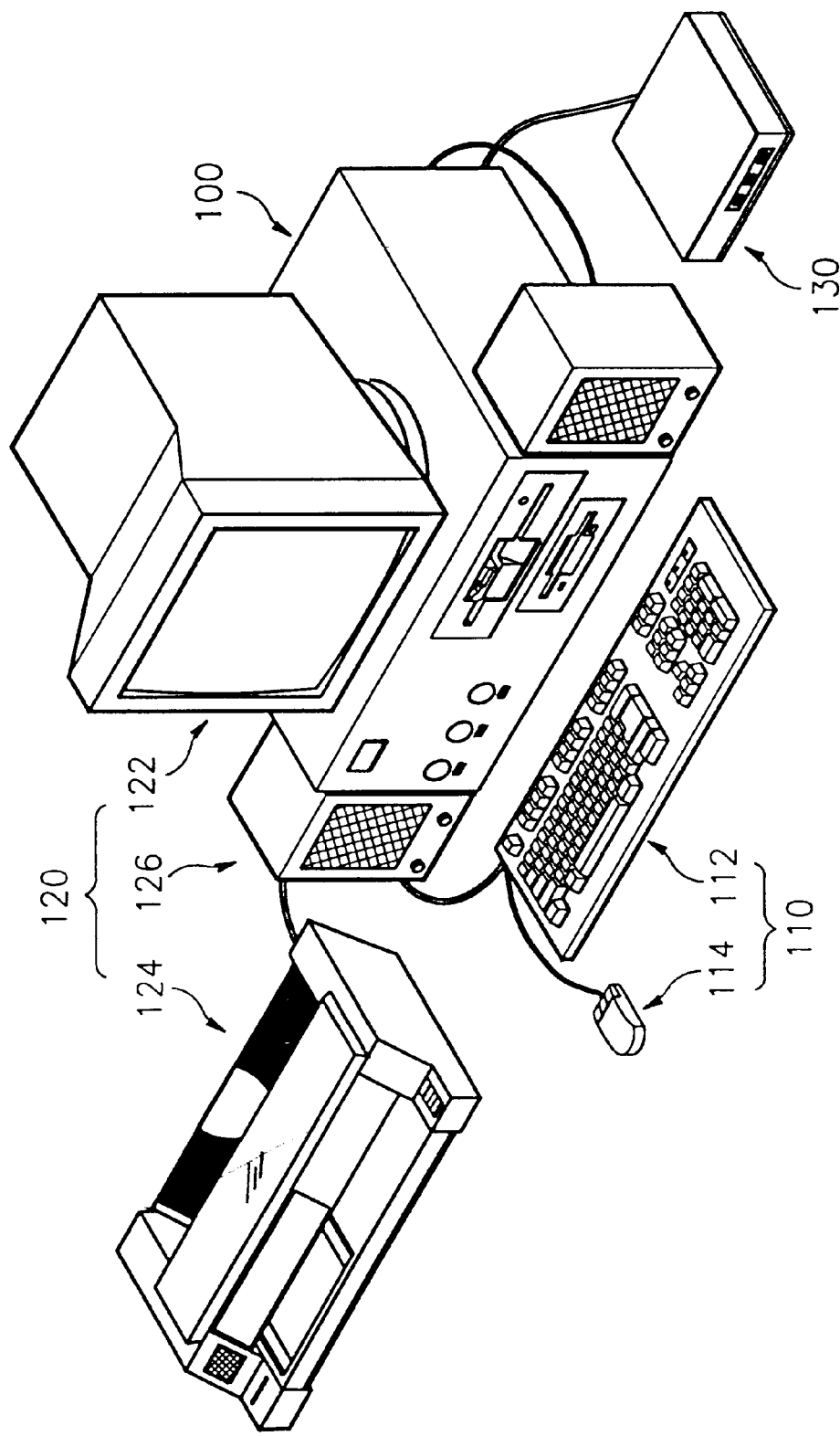
FIG. 1 illustrates a computer system upon which the embodiments of the present invention can be implemented.

The basic functions to the operation of virtually all computer systems are the capability of mathematical computation and logic functions. In FIG. 1, a current personal computer system is shown. The computer system consists of a main body or system unit 100, user input devices 110, user output devices 120, and communication devices 130. As well known, the main body 100 comprises a power supply for supplying operating voltages, a system or mother board that holds the principal circuitry of the system, and expansion or daughter boards for additional application functions such as a television service system, an audio player, a video player, a settop box for video on demand service, a communication service system, a game machine, a facsimile system, a video text system, a virtual reality machine, a home automation system, and so forth, which enable a user to expand his or her computer system.

The system board comprises a bus or communication circuits for communicating information, a central processing unit coupled with the bus for processing information, a random access memory used as a main memory, a read only memory unit for storing basic input/output system routines which control input/output peripherals of the computer system, a hard disk drive for storing operating system routines and other programs, and so on. Basic input/output system routines initialize and check the input/output peripheral circuits of the computer system every time it is turned on, and control many of the most important functions-how it interprets keystrokes, how it puts characters on a screen, and how it communicates its ports operating system routines control the operation of the computer system for the purpose of obtaining an efficient performance thereof Because the computer system tends to have more additional functions, use of the computer system becomes more complex. Also, when using peripheral functions, it would be possible to carry out any function after the system is powered on and operating system routines are loaded into random access memory by a bootstrap loader FIG. 1 shows a computer system upon which the embodiments of the present invention can be implemented. Referring to FIG. 1, the computer system consists of a main body or system unit 100, user input devices 110, user output devices 120, and communication devices 130.

Figure 2:
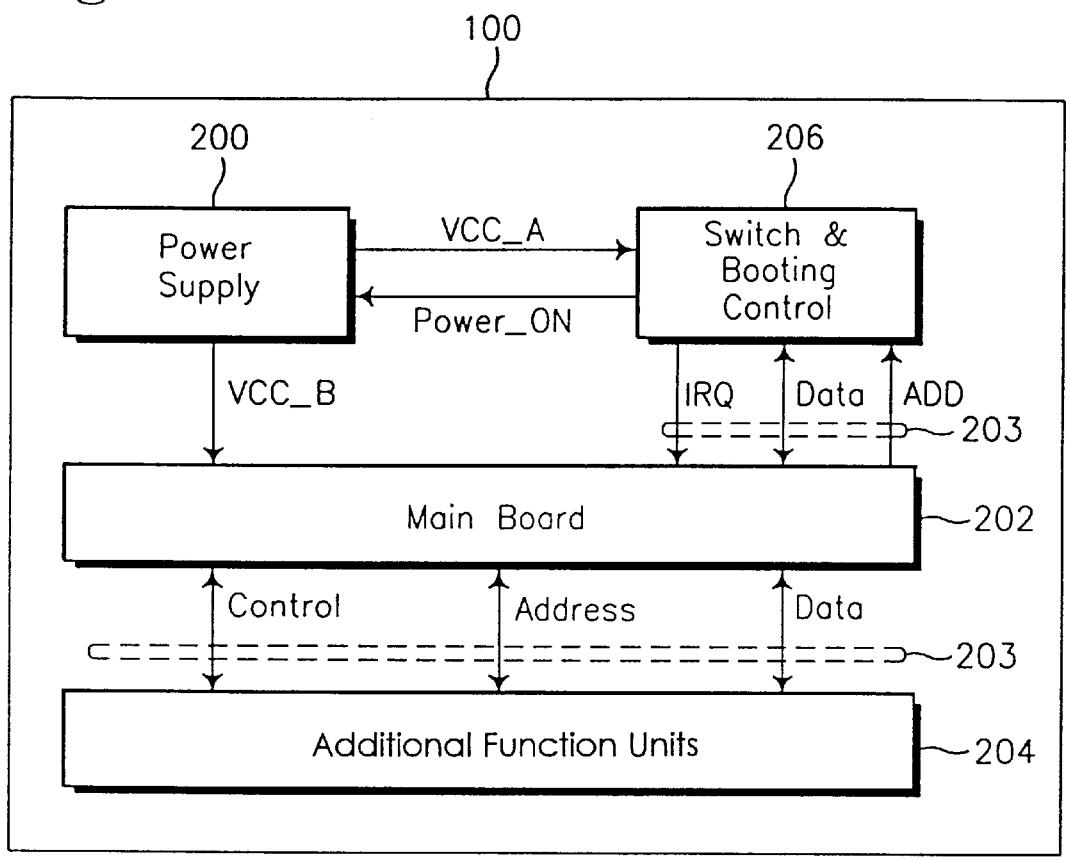
FIG. 2 is a block diagram illustrating a main body according to an embodiment of the present invention.

A schematic functional block diagram of the system unit 100 of a computer system according to an embodiment of the present invention is shown in FIG. 2. Referring to FIG. 2, the system unit 100 is made up of a power supply 200 for supplying operating voltages, a main or main unit 202 that holds a central processing unit and other principal circuits of the system, additional function units 204 for additional application functions such as a television service system, an audio player, a video player, a setup box for video on demand service, a communication service system, a game machine, a facsimile system, a videotext system, a virtual reality machine, a home automation system, and so on which enable the user to expand his or her computer system, and a switch & booting control circuit 206 for controlling the bootstrapping of additional application program routines. The power supply 200 applies a first direct current supply voltage VCC_A to the switch & booting control circuit 206. Also, the power supply 200 applies a second direct current supply voltage VCC_B to the other components such as main unit 202 and additional function units 204, in response to a power control signal Power_ON from the switch & booting control circuit 206. All components of the main unit 202 and additional function units 204 are coupled through a bus (referred to as a system bus) or communication circuits 203 to each other.

Figure 3:
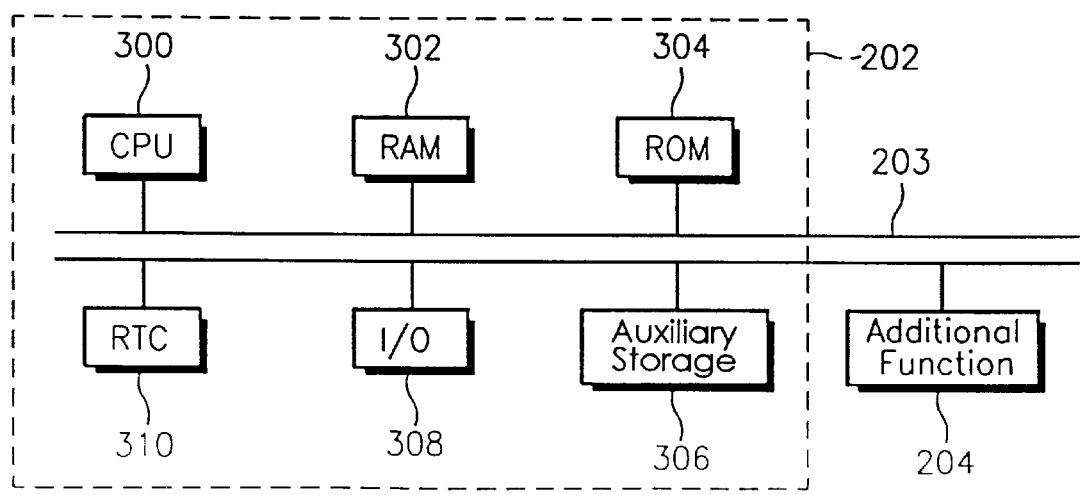
FIG. 3 is a block diagram illustrating components of the system board of FIG. 2.

FIG. 3 is a block diagram showing components of the main unit 202. Referring to FIG. 3, the main unit 202 is made up of a central processing unit 300 for processing information which is coupled with the bus 203. Central processing unit includes a control unit, an arithmetic logic unit, and several registers. Furthermore, for additional processing, speed, and special purposes, a number of coprocessors or digital signal processors, not shown, can be coupled to the bus 203, or incorporated into the central processing unit 300.

The main unit 202 further is made up of a random access memory or some other dynamic storage device (referred to as main memory) 302, coupled to the bus 203. Main memory 302 is used in storing information and instructions to be executed by central processing unit 300. The main memory 300 also may be used for storing temporary variables or other intermediate information during the execution of instructions by central processing unit 300. The main unit 202 also is made up of a semiconductor read only memory and/or other static storage devices 304 such as compact disk read only memory drive coupled to the bus 203 for storing static information and instructions for central processing unit 300. At least one auxiliary storage device 306, such as at least one hard disk drive, at least one floppy disk drive, and so on, can be coupled to the bus 203 for storing information and instructions. The main unit 202 is made up of input/output peripherals 308, such as a keyboard controller, a display controller, audio circuitry, serial and parallel interfaces, and so forth, coupled to bus 203. Furthermore, in main unit 202, real time clock 310 is coupled with bus 203 and interrupts the central processing unit 300 so as to load the basic input/output system and operating system routines into random access memory 302 at the time set by the user. Alternatively, real time clock 310 may be mounted on an expansion board. Real time clock 310 is made up of a battery independent of the power supply 200, a processor which is operated by the battery and measures time, and several registers or a non-volatile semiconductor memory such as an electrically erasable and programmable read only memory for storing organization information of the real time clock.

Turning to FIG. 1, a typical user input device 110 is an alphanumeric input device 112 including alphanumeric and other keys, for example, a keyboard. The alphanumeric input device 112 may also be coupled with the bus 203, which communicates information and command selections to central processing unit 300. Another type of user input device 110 is cursor control device 114 such as a mouse, a trackball, or cursor direction keys, coupled to the bus 203 for communicating direction information and command selections to central processing unit 300 and for controlling cursor movement on the display. This input device 114 typically has two degrees of freedom in two axes, a first axis (e.g., x) and a second axis (e.g., y) which allows the device to specify any position in a plane.

A typical one of user output devices 120 is a display device 122 such as a cathode ray tube (sometimes, referred to as cathode ray tube monitor) or a liquid crystal device can be coupled to the bus 203. The display device 122 is used to display information to a computer user. Another one of the user output devices which may be coupled to the bus 203 is a hard copy device 124 such as a printer, a plotter, etc. The hard copy device 124 may be used for printing instructions, data, or other information on paper, film, or some other medium. Furthermore, the computer system is made up of an audio device 126 as another output device which is coupled to the bus 203 and contains sound boards with the required audio circuits and loud speakers. The audio device 126 carries out several audio-related functions. The device 126 converts stored sounds from digital to analog form so that the computer user can hear them, records sounds for a later playback, creates sounds of its own with built-in synthesizers, mixes the results together, and amplifies the final audio product so that the user can actually hear it. The computer system further is made up of a communication device 130 such as a modem which exchanges files, programs, images, and information with other systems across telephone lines.

Figure 4:
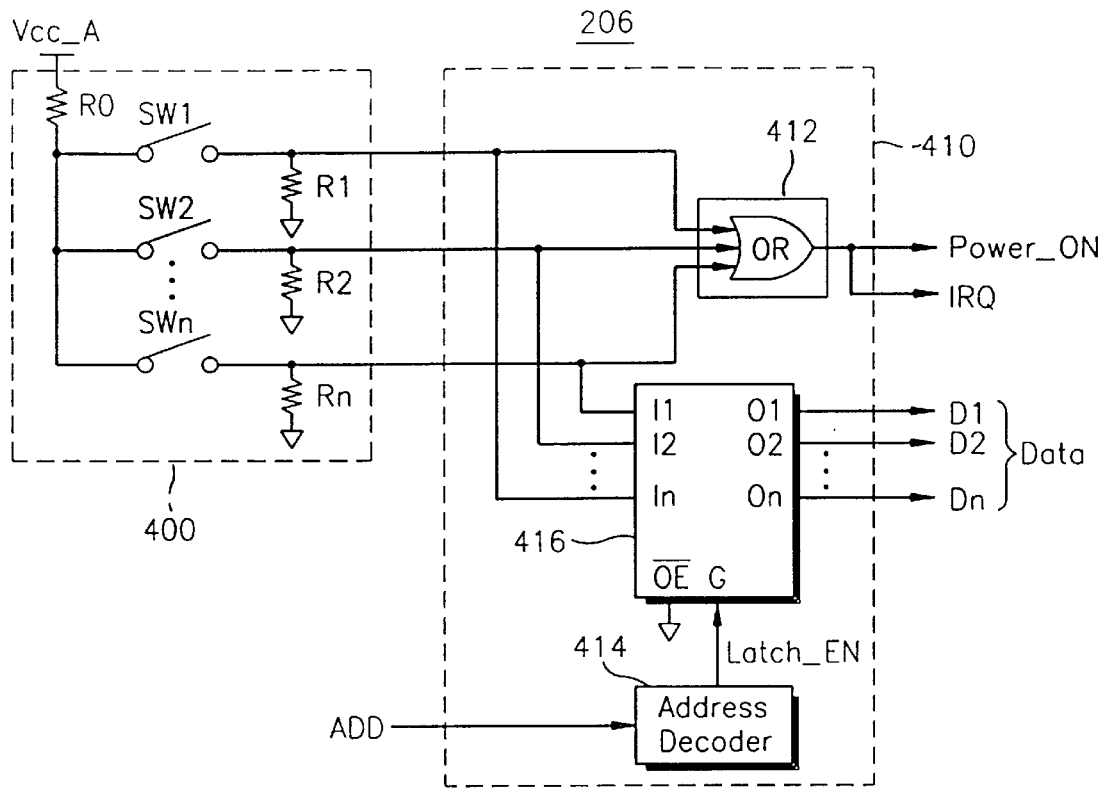
FIG. 4 is a detailed circuit diagram of the switch & booting control portion in FIG. 2.

FIG. 4 is a detailed circuit diagram of switch & booting control circuit 206 shown in FIG. 2. Referring to FIG. 4, the switch & booting control circuit 206 includes a switch circuit 400 and a booting control circuit 410. Switch circuit 400 is made up of n switches SW1–SWn for selections of the additional functions whose first ends are connected to supply voltage VCC_A through a resistor R0, and n resistors R1–Rn whose one ends and the other ends are connected to second ends of the switches SW1–SWn and a ground voltage, respectively.

The booting control circuit 410 is made up of a first logic circuit 412, a second logic circuit 414, and a booting data storage circuit 416. The first logic circuit 412 receives voltage signals on second ends of the switches SW1–SWn and generates a power control signal Power_ON and an interrupt request signal (IRQ). The second logic circuit 414 receives address signals from central processing unit 300 and generates a latch enable signal Latch_EN when the received address signal is a predetermined signal. The booting data storage circuit 416 is responsive to the latch enable signal Latch_EN and stores the voltage signals on the second ends of the switches SW1–SWn.

As shown in FIG. 4, the first logic circuit 412 is made up of an OR gate circuit which has n input terminals to receive voltage signals on the second ends of the switches SW1–SWn respectively and an output terminal to generate an output signal used as the power control signal Power_ON and the interrupt request signal IRQ. The second logic circuit 414 is made up of a decoder circuit for decoding address signals from central processing unit or other processors The booting data storage circuit 416 is made up of a register circuit having n input terminals I1–In connected to the second ends of the switches SW1–SWn respectively, n output terminals O1–On connected to the bus 203, more particularly to a data bus, an input enable terminal G connected with the latch enable signal Latch_EN, and an output enable terminal /OE being grounded. Register 416 latches the voltage signals on the second ends of the switches SW1–SWn when the latch enable signal Latch_EN is high, and provides the latched signals to bus 203.

Power supply 200 responds to the power control signal Power_ON and supplies the second supply voltage VCC_B to components of the main unit 202 and additional function units 204, such as central processing unit, random access memory, read only memory, hard disk drive, floppy disk drive, real time clock, etc. Central processing unit 300 applies a predetermined address signal to second logic circuit, that is, address decoder 414 when the interrupt request signal IRQ is generated from the first logic circuit 412. Then, the decoder 414 generates the latch enable signal Latch_EN. Accordingly, the booting data storage circuit 416 latches the voltage signals on the second ends of the switches SW1–SWn. Central processing unit 300 receives the voltage signals latched by the booting data storage circuit 416 as data signals D1–Dn through bus 203. The data signals D1–Dn are to be used in checking which additional function or one of the switches SW1–SWn has been selected.

Figure 5A:
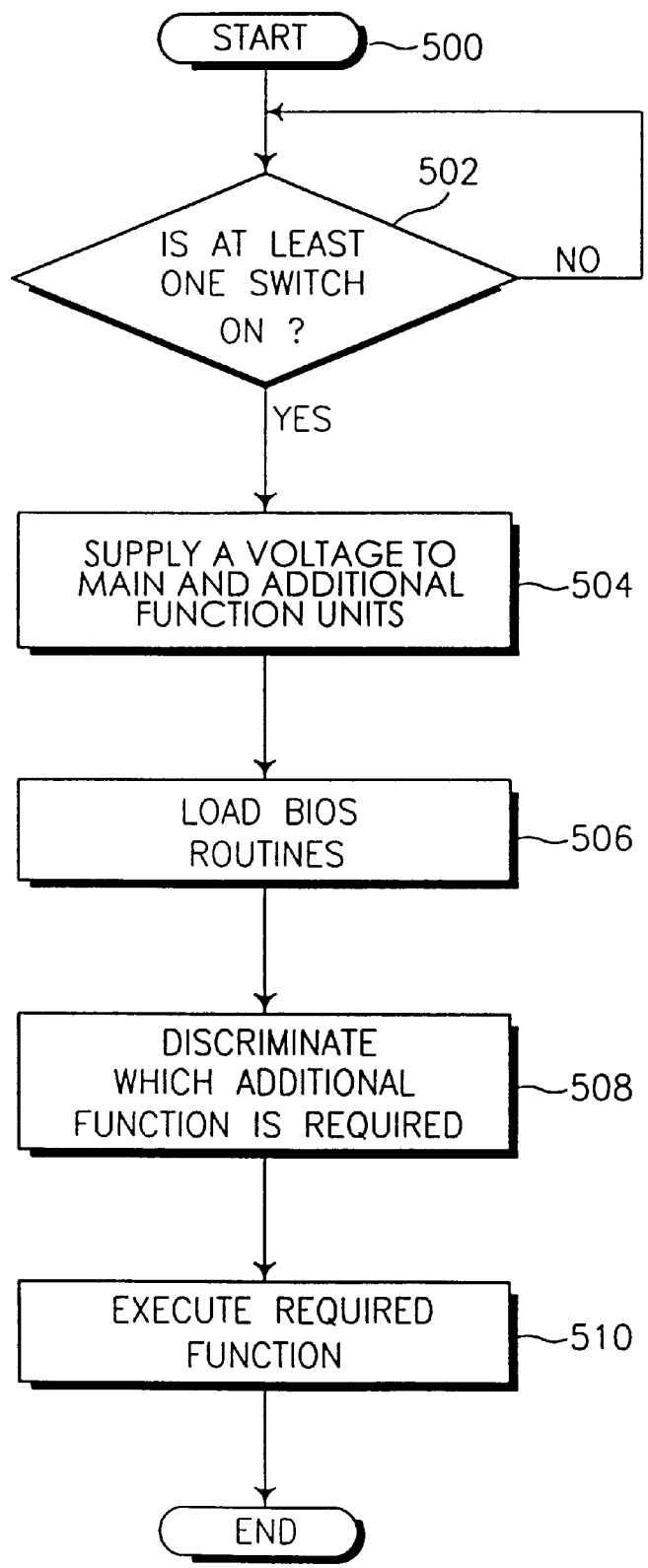
FIG. 5A is a flowchart of a method for executing additional application functions of the computer system according to the present invention when the system is in standby state.

FIG. 5A is a flowchart of a method for executing additional application functions of the computer system according to the present invention when the system is in standby state, that is, when the system is powered on and both basic input/output system and operating system routines are unloaded. Power supply 200 applies only a supply voltage VCC_A to switch & booting control circuit 206 when a power switch, not shown, is on by user, step 500. Switch & booting control circuit 206 detects whether at least one of the switches SW1–SWn is on, step 502. When at least one switch is on, Switch & booting control circuit 206 generates a power control signal Power_ON and an interrupt request signal IRQ, step 504. Then, power supply 200 applies supply voltage VCC_B to main unit 202 and additional function units 204, and central processing unit 300 receives the signal IRQ from the circuit 206. Therefore, central processing unit 300 initializes and checks overall circuits of the computer system in accordance with power on self test of the basic input/output system routines stored in read only memory 304.

Central processing unit 300 provides a specific address signal ADD through bus 203 to switch & booting control circuit 206. Address decoder 414 decodes the address signal ADD to generate a latch enable signal Latch_EN. Register 416 latches voltage signals on the second ends of switches SW1–SW2, in response to the latch enable signal Latch_EN, step 506.

Subsequently, central processing unit 300 receives the latched voltage signals as data signals for discriminating which at least one of additional functions is required, step 508. Central processing unit 300 loads application program routines corresponding to the at least one discriminated function into random access memory 302, step 510. With this, at least one required additional function is executed without loading operating system routines. For reference, U.S. application Ser. No. 08/744,815 filed by the same applicant discloses a technique for executing additional functions besides general mathematical computation and logic functions.

Figure 5B:
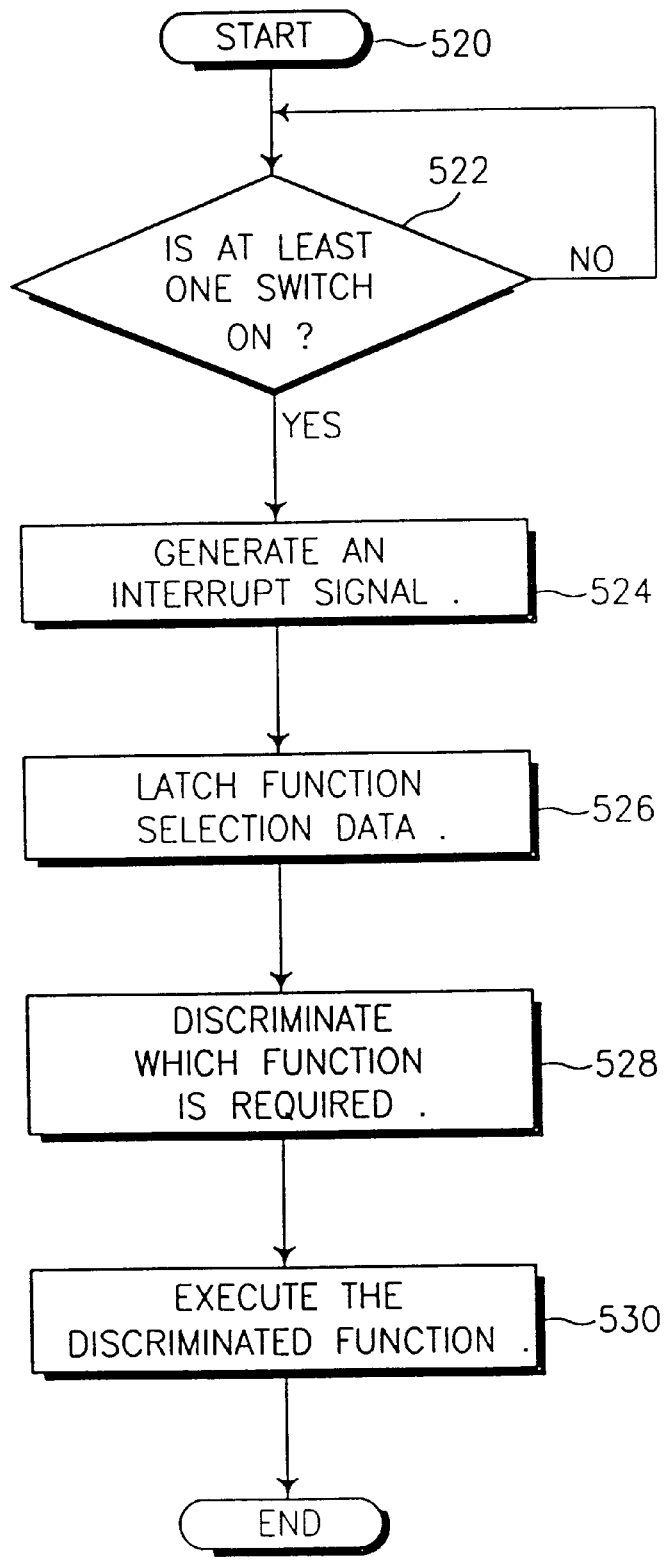
FIG. 5B is a flowchart of another method for executing additional application functions of the computer system according to the present invention when the system is in normal state.

FIG. 5B is a flowchart of a method for executing additional application functions of the computer system according to the present invention when the system is in normal state, that is, when the system has been powered on and both basic input/output system and operating system routines have been loaded. In this state, first supply voltage VCC_A is applied to switch & booting control circuit 206, and second supply voltage VCC_B is applied to main unit 202 and additional function units 204, step 520. Switch & booting control circuit 206 detects whether at least one of the switches SW1–SWn is on, step 522. When at least one switch is on, the circuit 206 generates an interrupt request signal IRQ, step 524. When central processing unit 300 is provided with the signal IRQ, it applies a specific address ADD through bus 203 to the switch & booting control circuit 206. So, the circuit 206 latches voltage signals on the second ends of switches SW1–SW2, step 526.

Subsequently, central processing unit 300 receives the voltage signals latched by the switch & booting control circuit 206 as data signals for discriminating which at least one of additional functions is required, step 528. Central processing unit 300 loads application routines into random access memory 302 corresponding to the at least one discriminated function, step 530. With this, at least one required additional function is executed.

Figure 6:
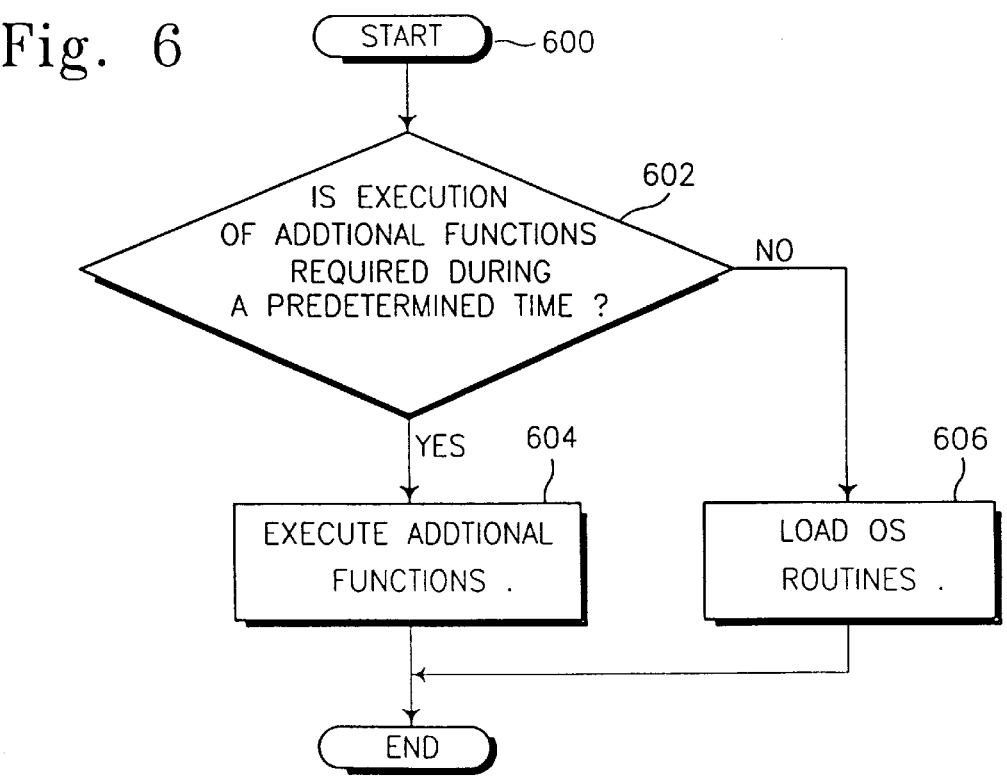
FIG. 6 is a flowchart of another method for executing additional application functions of the computer system according to the present invention.

FIG. 6 is a flowchart of another method for executing additional application functions of the computer system according to the present invention. Central processing unit 300 initializes and checks circuits of the computer system by means of basic input/output system routines stored in read only memory 304 when a power switch of the computer system is on, step 600. Central processing unit 300 checks whether execution of the additional functions is required during a predetermined time period (desirably, 2 to 5 seconds), step 602. Central processing unit 300 executes the additional functions when the execution of the additional functions is required, step 604. When the execution of the additional functions is not required during the predetermined time period, central processing unit 300 loads operating system routines into random access memory 302 so that the computer system is booted in accordance with the operating system routines, step 606.

What is claimed is:

1. A computer system, comprising:
    a bus for communicating information;
    a power supply supplying first and second supply voltages;
    a switch circuit for selecting the additional functions;
    a read only memory unit coupled with the bus, for storing a set of basic input/output system routines which control input and output peripherals of the computer system;
    an auxiliary memory unit coupled with the bus, for storing a set of operating system routines which control operation of the computer system for the purpose of obtaining an efficient performance of the system;
    an additional function memory unit coupled with the bus, for storing multiple sets of application routines which execute the additional functions respectively;
    a central processing unit coupled with the bus, for processing information according to instructions of the routines;
    a random access memory unit coupled with the bus, for storing the instructions, the information, temporary variables and immediate information during execution of the instructions by said central processing unit temporarily; and
    a booting control circuit operated with said first supply voltage, for generating a power control signal and an interrupt request signal when at least one of the additional functions is selected, said power supply to apply said second supply voltage to the central processing unit, the memory, and the input/output peripherals in response to said power control signal, and said central processing unit loads the basic input/output system routines and the application routines into said random access memory unit in order, in response to said interrupt request signal.

2. The computer system of the claim 1, wherein said switch circuit comprises:
    a plurality of switches, each having a first end and a second end, each first end being connected to said first supply voltage; and
    a plurality of resistors, each having a first end and a second end, each respective first end being connected to respective ones of said second ends of said switches and said each one of said second ends of said resistors being connected to ground voltage.

3. The computer system of the claim 2, wherein said booting control circuit comprises:
    means for receiving voltage signals on said second ends of the switches, and generating said power control signal and said interrupt request signal;
    means for receiving a predetermined address signal from said central processing unit, and generating a latch enable signal; and
    means responsive to said latch enable signal, for latching said voltage signals on said the second ends of the switches, and providing said latched signals to said bus.

4. A method for operating a computer system, comprising the steps of
    provide central processing unit, a first storage means for storing a set of basic input/output system routines and a second storage means for storing a set of operating system routines, a third storage means for storing multiple sets of application program routines for execution of additional functions, a plurality of switches for selecting the functions, and a system board;
    detecting whether at least one of the switches is on;
    applying a supply voltage to said board when at least one of said plurality of switches is on;
    initializing and checking circuits of the computer system by means of the basic input/output system routines;
    determining which additional function is to be loaded into said third storage means; and
    executing said additional function by means of the application program routines.

5. The method of the claim 4, further comprising the step of booting said computer system in accordance with the operating system routines when general computation and logic functions are required.

6. A method for operating a computer system, comprising the steps of:
    provide a central processing unit, a first storage means for storing a set of basic input/output system routines and a second storage means for storing a set of operating system routines, a third storage means for storing multiple sets of application program routines for execution of additional functions, a plurality of switches for selecting the functions, and a system board;
    booting the computer system by means of the basic input/output system and operating system routines;
    detecting whether at least one of the switches is on;
    generating an interrupt request signal when the at least one switch is on;

determining which additional function is to be loaded into said third storage means;

discriminating which at least one of the additional functions is required, in response to the interrupt request signal; and executing said additional function by means of the application program routines.

7. A multimedia computer system, comprising:

a bus for communicating information;

a read only memory unit coupled to said bus, for storing a set of basic input/output system routines which control input and output peripherals of the computer system;

an auxiliary memory unit coupled to said bus, for storing a set of operating system routines which control the operation of the computer system for the purpose of obtaining an efficient performance thereof, and multiple sets of application program routines for execution of additional functions;

a central processing unit coupled to said bus, for processing information according to instructions of the routines;

a random access memory unit coupled to said bus, for storing the instructions, the information, temporary variables and immediate information during execution of the instructions by said central processing unit, temporarily; and a power switch of said computer system;

said central processing unit loads the basic input/output system routines into said said random access memory unit so as to initialize and check circuits of the computer system when said power switch thereof is on, and loads the application program routines into said random access memory unit without loading the operating system routines when execution of the additional functions is required.

8. The computer system of claim 7, further comprising a real time clock unit coupled with said bus, for interrupting said central processing unit to load the basic input/output system routines into said random access memory unit at the time set by user.

9. A method for operating a computer system, comprising:

provide a central processing unit, a first storage means for storing a set of basic input/output system routines and a second storage means for storing a set of operating system routines, and a third storage means for storing multiple sets of application program routines for execution of additional functions;

initializing and checking circuits of the computer system by means of basic input/output system routines when a power switch thereof is on;

checking whether execution of the additional functions is required during a predetermined time period;

executing the additional functions when the execution of the additional functions is required; and booting the computer system by means of operating system routines when the execution of the additional functions is not required during the predetermined time period.

10. The computer system of claim 2, wherein said booting control circuit comprises:

an OR gate circuit having a plurality of input terminals to receive the voltage signals on said second ends of the switches respectively and an output terminal to generate an output signal used as the power control signal and the interrupt request signal;

a decoder circuit for decoding address signals from said control processing unit, and generating a latch enable signal; and a register circuit having a plurality of input terminals connected to the second ends of said switches respectively, a plurality of output terminals connected to said bus, an input enable terminal receiving the latch enable signal, and an output enable terminal to be always active.

* * * * *